US008726353B2

(12) United States Patent
Nisbet et al.

(10) Patent No.: US 8,726,353 B2
(45) Date of Patent: May 13, 2014

(54) SECURE COMPUTER USE SYSTEM

(75) Inventors: Carolyn Anne Nisbet, Worcestershire (GB); Barry Horne, Worcestershire (GB); James Edward Brownridge, Worcestershire (GB)

(73) Assignee: Qinetiq Limited (GB)

( * ) Notice: Subject to any disclaimer, the term of this patent is extended or adjusted under 35 U.S.C. 154(b) by 1203 days.

(21) Appl. No.: 12/092,213

(22) PCT Filed: Nov. 1, 2006

(86) PCT No.: PCT/GB2006/004072
§ 371 (c)(1),
(2), (4) Date: Apr. 30, 2008

(87) PCT Pub. No.: WO2007/052021
PCT Pub. Date: May 10, 2007

(65) Prior Publication Data
US 2008/0271124 A1    Oct. 30, 2008

Related U.S. Application Data

(60) Provisional application No. 60/731,927, filed on Nov. 1, 2005.

(30) Foreign Application Priority Data

Nov. 1, 2005  (GB) .................................. 0522210.4

(51) Int. Cl.
*G06F 7/04*  (2006.01)

(52) U.S. Cl.
USPC ............................................... 726/4; 726/25

(58) Field of Classification Search
None
See application file for complete search history.

(56) References Cited

U.S. PATENT DOCUMENTS

| 5,774,525 | A | 6/1998 | Kanevsky |
| 7,774,824 | B2 * | 8/2010 | Ross ................................. 726/2 |
| 2004/0029087 | A1 * | 2/2004 | White ........................... 434/219 |
| 2004/0103317 | A1 | 5/2004 | Burns |
| 2004/0158738 | A1 | 8/2004 | Tanaka |
| 2005/0132225 | A1 | 6/2005 | Gearhart |
| 2005/0144481 | A1 * | 6/2005 | Hopen et al. .................. 713/201 |

FOREIGN PATENT DOCUMENTS

| CA | 2497950 | 10/2005 |
| EP | 0 329 415 | 8/1989 |
| EP | 1 158 754 | 11/2001 |
| EP | 1 282 023 | 2/2003 |
| EP | 1 308 822 | 5/2003 |
| EP | 1 510 904 | 8/2008 |
| GB | 2 415 274 | 12/2005 |
| WO | WO 02/03178 | 1/2002 |
| WO | WO 2005/059684 | 6/2005 |
| WO | WO 2005/111841 | 11/2005 |

* cited by examiner

*Primary Examiner* — Brandon Hoffman
(74) *Attorney, Agent, or Firm* — McDonnell Boehnen Hulbert & Berghoff LLP

(57) ABSTRACT

Methods and apparatus for ensuring the computer security of users of a computer system are described. A user is allocated a security grading relating to how secure their computer system (2) is, for instance in terms of anti-virus software, firewalls and up-to-date security patches. Methods and apparatus (10, 12) for providing a security grading of a user's computer system are also disclosed. Users without a security grading or with low level security grading may then be accorded only basic access to the data or functionality of another computer system (8), for instance such as on-line banking services or the like. This ensures therefore that those users that take responsibility for their own security are allowed full access without undue security protocols whereas users without proper security do not have so much access.

17 Claims, 1 Drawing Sheet

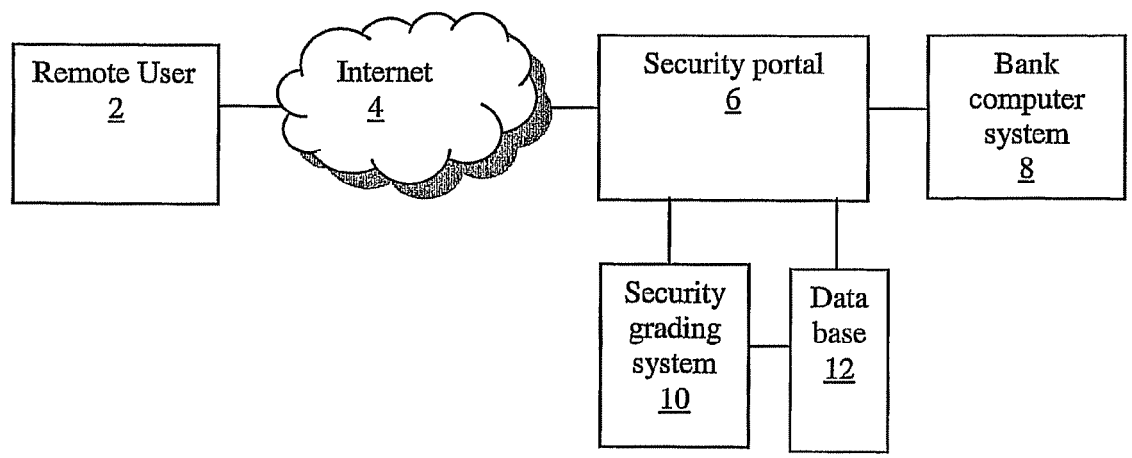

SECURE COMPUTER USE SYSTEM

BACKGROUND OF THE INVENTION (1) Field of the Invention

This invention relates to a method and apparatus for ensuring secure use of computer systems, in particular to a system which is capable of assessing the security of a user and to a system which provides differential access and/or functionality to a user based on their security assessment and which educates users in computer security.

(2) Description of the Art

Businesses are increasingly providing and maintaining various computer based services for users to access and use, for instance via the internet. For example there is continuing growth of on-line retail services where users can purchase goods and/or services on line. There is also a growth in financial institutions offering on-line services, for example on-line banking.

Obviously computer security is a concern. Viruses and the like can cause a reduction or loss of service which can impact the business. Indeed deliberate attacks to cause a denial of service are increasing by criminals seeking to extort money to restore service. Furthermore on-line fraud, identity theft and the like is increasing with a significant impact on businesses and consumers.

The businesses providing on-line access to their computer systems and on-line providers of services generally take steps to ensure the security of their computer systems and protect their systems from attack. However these businesses generally have no direct control over the security measures implemented by the users of their on-line system. The providers of a service may initiate an encrypted connection to allow access to their system and may require some form of identity check such as entry of a password but this may not be adequate if the user's computer is not itself protected against attack or if the user commits some security lapse.

Some users may have taken adequate precautions to protect their own computer systems from attack such that the security measures implemented on access are sufficient however other users will not have taken such precautions. Indeed many users may not be aware of the security measures that should be implemented or may be unaware that their computer system is vulnerable.

There is a great deal of information available about the security measures that users can take to protect their computer systems and general good computer security practice. However some users will not know where to find such information nor how to act on it.

There are also software tools available which allow a user to test the security of an aspect of their computer system, for instance Gibson Research Corporation provide an internet tool which provides a user initiated vulnerability scan of a personal computer looking for, for example, firewall security and basic security of the computer system. The user can then act on the results of this scan or not as they decide. Tools such as this are useful but require the user to be aware of their existence, to perform the scan and to act upon the results.

Security tools also exist which can automatically check workstations for security breaches or vulnerability to security breaches and disallow access to certain functionality if the workstation is not secure. International patent publication WO02/003178 discloses a method of network assessment and authentication which performs a security assessment on a workstation prior to allowing access to a network service. US patent application US2004/0158738 discloses a security management device which restricts access of a terminal in accordance with the security condition of that terminal. EP1158754 describes a client-server system having a security system for controlling access to application functions based on a security policy which determines the security requirements.

The above mentioned systems provide automated checks for defined security measures as set out in a security policy. These systems are intended for use in a corporate type environment where an organisation can and does mandate security policy for the users of its network facilities. For a business trying to encourage customers to use its network facilities mandating the security requirements may not be possible. Imposing security requirements which some customers may not understand may result in such customers being put off from using the services. Denying customers any access may likewise damage customer relations.

Unlike the non-corporate environment, where corporate security policy can clearly allow automatic computer security checks and updating of employees' workstation, it may also not be possible or desirable to alter the security settings of a remote user's computer system in the non corporate setting without their express permission. However many users may not understand the question if asked or may not want to change their settings but still want some access.

SUMMARY OF THE INVENTION

The present invention therefore provides a method and apparatus to encourage the remote user of a computer system to implement security measures for their own computer system and also to a method and apparatus for grading a user according to how secure their computer system is. The present invention allows a computer system to provide different access and/or security to users based on the security grading of their computer system and puts the remote users in control of the degree to which they undertake security improvements and hence gain increased access.

Thus according to the present invention there is provided a computer system accessible by remote users wherein the level of access of such remote users is based upon a security grading of the remote user's computer system wherein the main computer system has access to a means for providing a security grading of a remote user's computer system having a plurality of test modules that a user is invited to complete and the security grading of the remote user's computer system is based on the number of modules successfully completed.

The present invention therefore provides a computer system, which, for ease of reference with be referred to as the main computer system, which allows a differential level of access to users depending on a security grading of their computer system, the remote user being accorded a greater level of access the better their security grading. The access granted by the main computer system to the remote user could be access to a different level of functionality of the site, for instance for an on-line banking service the lowest level of access may be to view statements only whereas the next level of access may allow the user to request services. A full level of access may give the user the ability to make payments, arrange transfer and keep their details up to date. Access may also refer to the amount of the main system that the user is allowed to connect to and/or may refer to the editing rights of the remote user.

Note that as used herein the term computer shall include any type of electronic device which has a processor and as is able to send and receive data to a remote source. For instance the term shall include personal computers including laptop and palmtop computers and other mobile computing platforms, network servers, mobile telephones, game consoles and the like. The term computer system shall include a device or any network or arrangement of interconnected devices generally under the control of one person or organisation. The term remote user means a user external to the main computer system who wishes to use their own computer system to gain access to the main computer system whether via the internet, local area network, wireless connection or any other means of connecting.

Further the main computer system has access to a means for providing a security grading of a remote user's computer system. In other words the main computer system is either provided with its own means for providing a security grading, i.e. it hosts its own security grading tools, or the main computer system may be connectable to a security grading toolset hosted remotely. Obviously when the security grading toolset is hosted remotely it will be hosted securely to ensure it itself is free from interference and there should be a secure connection between the security grading toolset and the main computer system.

The means for providing a security grading of a remote user's computer system has a plurality of test modules that a user is invited to complete and the security grading of the remote user's computer system is based on the number of modules successfully completed.

Thus the present invention provides a computer system that provides a differential level of access to users with different security gradings allowing more secure users more access. However the security grading is obtained by allowing the user to complete a number of modules. The users chooses which modules to complete and therefore decides themselves on the appropriate security provisions. The modules are designed to not only upgrade computer security but also to educate the user and make the user take an appropriate level of responsibility for their own security. However if a user does not require full access to the main computer system they are not necessarily blocked from the access they need. The present invention therefore educates users in the non-corporate setting about appropriate security.

The main computer system may have at least two predefined levels of access. The main computer system may recognise at least two different security gradings and in some embodiments the number of security gradings may relate to the number of different predefined access levels.

Remote users not having a recognised security grading may be allowed only the lowest level of access and/or may be allocated the lowest possible security grading. Thus a new user of the main computer system who has not established their security credentials would be given the lowest level of access but would not be blocked from any access. Thus a new user with minimal security may be able to browse an on-line catalogue but may be prevented from setting up an account. This would protect the main computer system from users who have no or minimal security measures from creating vulnerabilities in the main computer system. However users who can prove that they have security measures in place may be accorded a higher security grading and can therefore be trusted with greater access. To attain the highest security grading the user may need to have robust security for their own computer system.

The test modules include modules designed to educate the users and also help them test or upgrade their security products. They may include modules relating to various aspects of computer security, for instance it may have modules relating to at least one of antivirus tools, firewall tools, software security updates and patches, and general security practice. The modules are preferably relatively easy to complete and provide the user with the information and tools they need in an easily digestible manner. As the user chooses the modules they wish to complete there is no requirement to complete all the modules. However the security grading of the user's computer system depends on the modules successfully completed. Again this puts the emphasis on the user but does not create an unnecessarily high burden for a casual user requiring a low level of access.

For instance the means for providing a security grading may comprises several modules relating to anti-virus tools. The modules may be structured so that they need to be completed in order and successful completion of one module is required before the next module can be attempted. A first module may be an information based module only and would give the user a brief overview of the anti-virus products available and how to obtain, install and maintain an antivirus product. Merely reading the information would be successful completion of this module.

Providing information to a user is useful but does not guarantee that they will take such advice. Therefore the means for providing a security grading preferably includes at least one tool for checking at least one aspect of the security of the remote user's computer system. In other words the user is provided with the opportunity to test the security of their computer system and it must pass certain checks to attain a higher security grading.

In one form the tool for checking security may be at least software tool that can be downloaded and/or run to check the security of the user's computer system. It may be that one tool could perform a plurality of checks including basic security checks and checks of increasing security sophistication. The result of these checks could be used to give an initial security grading. The results would also be communicated to the user along with a series of instructions on what would be needed, if anything, to achieve better security and a higher security grading. Whilst it is possible that one tool could do all these checks it might be easier to provide different tools to check for different aspects of computer security or to do different levels of test.

For instance referring back to the modules mentioned above there may be a second anti-virus module which invites the user to download and/or run a tool which checks for the presence of active anti-virus software on their computer system. If such software were found the module would report that satisfactory anti-virus software was operating and the module would be successfully passed. If no such software was found or if the software was deemed to be unsatisfactory the tool would report this to the user and preferably also indicate to the user what could be done to rectify the deficiency. The module would therefore be unsuccessfully completed, which would be recorded by the security grading means, but could be attempted again later when the user has remedied the deficiencies. In some instances the tool may be able to automatically correct any deficiencies noted and if it did so, say at the prompting of the user, the module would then successfully completed.

Similar modules would preferably exist for providing information and providing tools for checking on the existence and operation of a satisfactory firewall and the latest security patches and updates for their operating system. The same tool could carry out checks for different aspects of the user's computer system, for instance checking for the operation of a firewall and anti-virus software, therefore running one tool may complete more than one module. The level of checks performed by the tools may increase with higher modules. For instance a first firewall module could provide simple information about firewalls and information about how to obtain, install and maintain a firewall. A second firewall module may include a tool which checks for the existence of a firewall and runs a port check for commonly open ports. A more detailed scan could be performed in a third firewall module which tests the firewall, for instance by simulating an attack.

The level of security grading is then based on the modules successfully completed by the user. For instance a new user who has completed no modules could automatically be allocated a security level 0. Completing first level modules which contain information and links to anti-virus products, firewalls and security updates may not increase the security grading but would give the user the information they needed prior to the second level modules. Second level modules could then comprise tools to be downloaded and/or run to establish the existence and operation of at least basic anti-virus software and firewalls and key security patches. If the user so chooses, completing all the second level of modules may then accord the user's computer system an increased security level, security level 1. Security level 1 would allow the user an increased access to the main computer system. A user who was happy with this level of access would not be required to conduct any further security checks. However there may be further modules in certain areas which conduct more detailed tests and require more advance security products to be operating in order to pass. Completing these modules would accord the user's computer system security level 2 which would allow the user's yet more access to the main computer system.

There may also be modules relating to general good computer security practice, for instance containing information about good password practice, usage guidelines, being aware of phishing etc., Completing these modules may or may not impact on the security grading of a user's computer system but in any case helps to educate interested users in good security practice.

It will be apparent from the foregoing that the security grading looks at the security of a particular computer system so the grading is based on an assessment of that computer system. It would be possible to accord a user a security grading based on an assessment of their most commonly used computer system, for instance a home based PC, and rely on the user not to use insecure computer system. The security grading of the home PC would make the user think about security and would teach them of the dangers of using insecure computer systems and would thus improve overall security. It is therefore preferable that the security grading is linked to a particular computer system Thus a user with access to more than one computer system may have different security gradings for each computer system. For instance a user may have a home PC and also a work PC and may want to access the main computer system from both systems. The user may complete the modules mentioned above and receive a security grading for their home PC. If the user then later attempts to access the main computer system from their work PC the main computer system preferably recognises that this a different computer system and requires a new security grading for that PC. This then avoids the risk of a user accessing the main computer system from a different, insecure, computer system and being accorded a high level of access.

The main computer system may therefore require a data package, e.g. a cookie or similar, to be stored on the particular computer system which has received the security grading. The data package would be unique to that particular computer system and would be used in identifying and/or verifying the particular computer system the user is using. When the user accesses the main computer system from the graded computer system the main computer system can check the data package against its records and therefore confirm which computer system the user is using and what the appropriate security grading thereof is.

Where the security grading involves machine specific tests, for example for the existence of a functioning firewall and also information or awareness tests, obviously only the machine specific tests need to be completed for each computer system that the user may use. The information based modules are related to knowledge of the user and hence once completed on any machine are completed for that user whatever computer system they use to access the main computer system.

The computer system specific data package may however be available to other users of the same machine. Thus for instance if one computer system is accessible by several users one particular user completing the machine specific tests may, in effect, complete the machine specific tests for all users. However the main computer system would preferably require each user to complete the knowledge based tests/modules themselves so that each user has to have an awareness of the security issues.

Further whilst the status of the user's computer system is checked in order to achieve a security grading there could be changes to their system after the security grading has been achieved. For instance a user may accidentally disable part of their security set-up. Further there could be new security updates, viruses identified etc. which mean that the security systems require updating. Therefore the security grading could be time limited and require periodic refreshing to maintain the same grading. For instance some modules may need to be re-taken after a certain period of time which may be related to the level of security grading attained—for instance for the highest level of access a check need to be performed reasonably frequently, say every month or two months. For a lower level of security the re-checks may need to be completed less frequently, say every six months. Therefore any lapses in the security of the user's computer system will be picked up in a regular review and the higher the security access granted the more often the check. It is therefore preferable that the security grading contains an indication of when that grading was achieved.

One of the downloadable software tools used in achieving a security grading could be arranged to perform periodic re-checks of the user's computer system so as to confirm that the security products are still functioning correctly and are up-to-date. If it detects a problem it could inform the user and inform the main computer system, for instance the next time the user attempts to access the main computer system.

Where new security issues are identified, for instance new forms of virus, or new vulnerabilities are identified there will be security updates and patches produced. The security grading toolset will be updated with tests for new viruses and new patches etc. and the main computer system may no longer recognise security gradings achieved prior to the date the patch was included in the grading toolset until the user has successfully completed a test for necessary updates. Therefore suppose a new vulnerability in an operating system had been identified and a patch produced. This patch would be included as part of the security grading toolset and any new users would need to have this patch to successfully achieve a high security grading. Users who achieved a security grading of say, security level 3, prior to the incorporation of this patch into the security toolset may or may not be adequately protected. Therefore the next time they try to access the main computer system it recognises that security grading is an old grading and so does not recognise the grading. Depending on the degree of vulnerability that the new patch addresses the user may be downgraded to a level 2 or level 1 security grading. The user will be informed of this and will generally be directed to the security grading toolset to install the necessary patch and/or test it is operating. Provided they successfully do so their grading will be restored to level 3 and re-dated to the date of retest. In other words then the main computer system may downgrade a security grading based on the age thereof.

The main computer system preferably communicates with a security portal which determines the security grading of the remote user's computer system. The term security portal is used simply to mean the computer systems and/or software which are responsible for checking the identify of a user and finding out the relevant security grading. Where the user already has a security grading this can be determined in various different ways as will be described below—if the user does not have a recognised security grading they will be allocated the lowest possible security grading.

The security portal may be part of the main computer system or in some embodiments the security portal may be externally hosted. The main computer system will then have a secure link to the externally hosted security portal.

Where the main computer system hosts its own security grading toolset it can maintain a record of the security grading of remote users' computer systems. Therefore when a remote user makes a connection with the security portal the appropriate security grading can be found and the appropriate level of access granted.

An alternative arrangement is that the main computer system does not maintain a security grading toolset itself but is capable of making a secure connection with an externally hosted security grading toolset in which it has confidence. To the user however it would be just the same as if the security grading toolset were hosted by the main computer system. Any information regarding security grading of users could be supplied to the main computer system which could then maintain its own records. Alternatively records regarding the security grading of users could be maintained on the secure site where the security grading toolset is located. In this case when a remote user accesses the security portal it could interrogate the secure site to determine the security grading of the remote user's computer system. In any case the security portal has access to records of users and their security gradings and requires a check of the security grading of a user in allowing access to the main computer system.

In some embodiments of the invention there may be more than one security grading toolset trusted by the computer system. For instance there could be a number of providers of security grading services. In such a case the security portal may interrogate the remote user's computer system to determine the source of the security grading. If this source is known to the main computer system and trusted the security portal may request the security grading or some verification from the identified source using secure means.

Alternatively the security grading of the remote user's computer system could be supplied to the user in a secure form, such as an encrypted authentication. The authentication could contain details identifying the remote user's computer system tested, the security grading and possibly the security grading authority and date of security grading. When the remote user attempts to access the main computer system the security portal may ask for the secure form of the security grading which it would then authenticate, for instance by decrypting using the grading authorities public key. If the grading was authenticated and matched the details of the remote user's computer system the user would be accorded the level of access due to the that security grading. In effect the user would be supplied with a signature from the grading authority which would contain information about the user and their computer system. This could be used by the main computer system as an authentication of the grading.

The present invention therefore provides a main computer system which allows different access to different users depending on how secure their computer systems are and provides users with the means to obtain a security grading. This increases the overall security of the computer system by encouraging users to look after their own security but without it being burdensome on the user. Providing very detailed security protocols for every user would deter a number of users from accessing the main computer system at all and would apply indiscriminately, i.e. it would apply equally to those users who had taken good security precautions as it would to those users who had not. Furthermore they may not be wholly effective at protecting the computer system.

By providing access to a means of achieving a security grading the operators of the main computer system provide users with information they need to protect their own computer systems. Those users who want additional access to the main computer system can then install security products as necessary and then test their computer system to ensure it is secure. Having done all this once they then have a security grading for that computer system and can, from that point onward, obtain a certain level of access to the main computer system with the usual level of connection security protocols. In some instances this security grading, once achieved, will be all the security tests required although in some instances there may be a need for a periodic re-check. If the user wants to achieve a higher level of access they need to show that they have implemented additional security measures. Thus it is only the users who want the full range of functionality who have to undergo the more rigorous security checks and again, once these have been successfully completed the user has only periodic re-checks to do.

The providers of the main computer system thus provide their users with all they need to increase security of their system and therefore increase overall computer security. They also give the users an easy way to test that security and by giving access based on that security also give confidence to the users.

It is of course possible that some users may be unable to complete all the necessary modules and their own security settings may prohibit or prevent some of the checks needed to access a higher security grading. The operators of the main computer system may choose to allow certain users a higher security grading if they can prove through other means that they have a secure system. Businesses may be able to provide statements detailing their security measures and receive accreditation that way.

The present invention also therefore provides a method of allowing remote users access to a main computer system comprising the steps of checking a recognised security grading of a remote user's computer system and allowing a level of access based on the security grading which, on failure to recognise a security grading, directs the user to a security grading toolset comprising a number of test modules that a user is invited to complete.

The method allows a greater access to the main computer the higher the security grading of the remote user's computer. Where a remote user's computer system does not have a recognised security grading the main computer system only allows the lowest level of access. This could be ensuring all new users enter via a security portal or automatic redirection to a security grading toolset. Alternatively the user may simply be provided with details of how to access the security grading toolset so as not to interfere with their current access. The user can then decide whether or not they wish to achieve a security grading by completing a number of tests of their computer security.

The security grading toolset comprises a number of test modules and the method may involve allowing the user to complete various modules, the security grading being based on the modules successfully completed. The modules may comprise information and tests for anti-virus software, firewalls, security updates and patches, and general computer security. As described above the security grading toolset preferably has at least one tool for testing at least one aspect of the security of the remote user's computer system.

As mentioned above the present invention implements a security grading service to provide either a user or system which may be accessed by a user with a grading of the security of their computer system. Therefore in another aspect of the invention there is provided a security grading system for providing a security grading of a user's computer system wherein the security grading system comprises a plurality of test modules which the user may attempt and the security grading of the user's computer system is based on the modules successfully completed. The various test modules may be implemented as described above in relation to the security grading toolset.

Preferably there is at least one tool for checking at least one aspect of the security of the user's computer security for instance the existence and/or operation of anti-virus software, firewalls and security updates.

The security grading system may maintain records of user's computer systems and their security gradings. The security grading system may be adapted to supply details regarding the security grading of users to requesting computer systems so as to allow the requesting computer system to determine the level of access to be granted to the user. This may be in the form of a verification of a security grading level which has been supplied to the requesting computer system by the user's computer system or may be simply an indication of the user's security grading when supplied with details of a user's computer system. Supplying details of a user's security grading may be restricted to approved requesting systems so as to avoid criminals from obtaining data on the level of security of user's computer systems.

The security grading system may provide the user's computer system with data relating to its security grading which can then be communicated later to a computer system to which the user may wish to gain access. The data relating to a user's security grading may be supplied in a secure form that may be authenticated by the computer system which the user wishes to access.

In a similar fashion to that described above the security grading may be time limited and/or may contain information relating to the date the grading was achieved. The security grading system preferably is capable of determining what updates a user needs to maintain their current security grading. This may be implemented in response to a request by a user or it may be done automatically. The security grading system could automatically contact the user when updates are required and/or their current security grading is about to expire so as to allow the user to take steps to maintain their security grading.

The present invention also relates to a method of providing a user with a security grading comprising the steps of performing at least one test of at least one aspect of the security of the user's computer system and using the result or results in determining the security grading. The at least one test could test basic security measures as well as more stringent security measures and determine a security grading based on the result. Alternatively the basic security checks could be contained in one test or series of tests and the more stringent checks in one or more other tests or sets of tests. In the latter case the user may choose which tests they wish to perform. Preferably the tests include a test on the existence and operation of at least anti-virus software and one or more firewall. Preferably the method involves the step of providing the user with a plurality of test modules and the security grading is based on the test modules successfully completed.

The present invention also relates to a security grading service. Thus in another aspect of the invention there is provided a method of providing a requesting computer system accessible by users with an indication of the security grading of registered user's computer systems comprising the steps of providing users with a means of obtaining a security grading for a user's computer system, recording details of the user's computer system and the security grading thereof and, in response to a request from a requesting computer system providing an indication and/or validation of the security grading of a user's computer system.

DESCRIPTION OF FIGURES

The invention will now be described by way of example only, with reference to the following drawings of which;

FIG. 1 shows an illustration of how a remote user may access a computer system.

DESCRIPTION OF PREFERRED EMBODIMENTS

An example of a remote user accessing a banking computer system will be used as an illustrative non-limiting example of the present invention and how it may be applied.

As shown in FIG. 1 a remote user may use their computer system 2 to connect to the internet 4. For this example the remote user's computer system is a personal computer which is connected to the internet through a broadband connection in the user's home. However as the skilled person would understand the invention is applicable to a wide range of computing devices such as palm tops, PDAs, mobile telephones and the like. Further although described in the sense of a consumer accessing a service the present invention is equally applicable to business systems and the remote user could be the network of a business which wishes to access the network of a supplier say.

The remote user connects via the internet to a banking computer system 8 via a security portal 6. The security portal 6 is responsible for establishing a secure link between the remote user 2 and the bank computer system 8. For several on-line services the security portal, which is part of the banking system, simply checks that the user's PC has a browser which supports 128 bit encryption and requires the user to supply some sort of identification such as a password or passcode. Having made an encrypted connection and passed the identity check the user typically then has complete access to the computer system for their account. For several on-line applications it may be that different users are accorded a different level of access depending on a variety of factors, for instance whether they are members, the amount of business they have transacted previously, whether they are trade or general consumers etc. but this differential level of access to the site is not governed by the security grading of the user's computer system and indeed users will receive the same access if they access the site from a different computer system.

In the present invention however the security portal also does a check on the security grading of the user's PC. The user may for instance access the site as normal and provide their account details and password. The security portal may then check a database of users 12 to determine whether that user's computer system has a security grading. If the user has not accessed the site before they will not have a security grading and therefore will be automatically be directed to the bank's security grading system and will open a page indicating their security grading.

The security grading page gives the user an indicating of what their current security grading is. As the user has not yet completed any security grading they will have an initial security grading of level 1 which is the lowest level. They can choose to exit the security page without any further action by following the appropriate link but in this case they will only be allowed level 1 access to their account. This may for instance simply comprise the ability to see statement details.

The security page also provides the user with a brief introduction to how the security grading works. The security grading system has a number of checks or test modules for the user to complete and the security grading accorded to the user is based on the checks or modules successfully completed. The modules are grouped into four themes; anti-virus software, firewalls, updates and good practice. Within each theme there are a plurality of modules of increasing rigour.

The security page will display which modules have been successfully completed by the user, for example in table form, and would also indicate what checks needed to be successfully completed for the various security gradings which are achievable.

The security page would contain links to each of the test modules. Each of the test modules would either contain information for the user about the relevant security issue, provide advice on where products are available and how to obtain and install or provide tools for testing the security of the users PC. The tools may run from the bank servers but for the more advanced tools to be effective the user would need to download the tool and run it locally on their own PC.

Examples of the type of modules that may be used are;

Anti-Virus Module 1

This module would provide brief information on what anti-virus software does and why it is useful it would also provide links to both commercial and free anti-virus software. It would not require the user to do anything at this stage. The module may have a button that the user needs to click to indicate they have read the material on the page to complete this module.

Anti-Virus Module 2

In the AV module two the user would be invited to download a software tool that would check for the existence of valid anti-virus software with up-to-date virus definitions. The user would be guided as to how to download and run the tool and once the tool had completed it investigation it would report its findings to the user and to the bank's security grading system. If the result of the test is that the user has acceptable AV software this module would be successfully completed. However if the user had no such software, or it was not functioning correctly or was too out-of-date the module would be failed. The user would be given an indication of why the test failed and, as far as possible, the steps needed to correct the deficiencies. At any time they would be able to log into the bank's system again, access the security page and try the module again.

Firewall Module 1

The first firewall module would be similar to the AV module 1 in that it would contain information about what firewalls are and why they are important and provide links to free and commercial firewall packages. Again a button click to confirm the user had read the information would successfully complete the module.

Firewall Module 2

The second firewall module would perform a port-scan of the user's PC for commonly open services at the user's initiation. If the scan found that the ports were satisfactorily blocked the module would be completed successfully otherwise the module would fail and the user would again be given remedial advice.

Firewall Module 3

A third firewall module may be provided which provides a more sophisticated tool that the user would be invited to download and run. This tool would scan for a firewall and would also seek to connect back to the main server in a manner similar to what a real Trojan would try. If the firewall worked satisfactorily the module would be passed.

Update Module 1

The first update module would again be based around advice, information and links to necessary sites. For instance the windows update site would have a link for windows based systems. Again a button to confirm the information has been read would successfully complete the module.

Update Module 2

The second update module would involve checking that all critical patches and updates were present. If the user has all the latest key updates the tool would confirm this to the server.

User Education Modules

The user education modules may contain multiple choice quizzes which the user has to successfully complete. The multiple choice nature of the quiz provides for interactive learning which engages to the user in an easy fashion. The type of education may vary depending on the service which the user is accessing but may cover such topics as good password practice, usage guidelines, information of when it is safer to supply bank details etc. and information about how to spot phishing and avoid giving important information away.

The user could complete the modules in one sitting if they had the necessary protections in place so the security grading isn't an onerous procedure. However any modules can be completed at any time and the server maintains details of what modules have been passed so that a user can attempt the later modules at their convenience.

The security grading is based on the modules completed. For instance using the modules described above a new user is allocated to security level 1. To achieve security level two the user would have to successfully complete anti-virus module 1, firewall modules 1 & 2, update module 1 and education module 1.

To achieve the highest security level, level 3, would require the successful completion of anti-virus module 2, firewall module 3 and update module 2.

It can therefore be seen that security level 1 is the entry level accorded to all users. Security level does not actually require a user to have anti-virus software or the latest updates, merely to have read the information about the products available. It also requires a basic knowledge of firewalls and a basic firewall check to have been passed. Level 2 is therefore not an onerous requirement for a user to achieve. Level three security however requires the presence of operational up-date anti-virus software and the latest key updates. It also requires a more thorough firewall check. Level 3 therefore indicates a reasonable level of computer security.

The different levels of security grading provide different levels of access to the computer system. For instance, taking the banking example a user with level one access, i.e. a new user who has logged on as normal but has completed virtually no security checks, would only be allowed to see their statement details.

A user with level 2 security access, could be allowed to do more but, in accordance with the fact that they don't have full security access they may be limited in sensitive areas. For instance a level 2 user may be able to arrange payment to existing payees or transfer money between their accounts, cancel existing standing orders, order chequebooks to their registered home address or order travellers cheques or currency to be delivered to their branch. A level three user would have full access to the functionality of the site, for instance they may be able to set up new payments, create direct debits and standing orders, amend personal details etc.

The present invention therefore provides a system which encourages users to take responsibility for their own computer security and rewards them by increased access for taking such measures.

Although three security levels have been indicated in this example there may be more in practice and the number and nature of the tests on a user's computer system could vary.

The invention claimed is:

1. A computer system accessible by remote users wherein the level of access of such remote users is based upon a security grading of the remote user's computer system wherein the main computer system has access to a means for providing a security grading of a remote user's computer system having a plurality of test modules that a user is invited to complete and the security grading of the remote user's computer system is based on the number of modules successfully completed, wherein the test modules include modules relating to at least one of antivirus tools, firewall tools, software security updates and patches, and general security practice.

2. A computer system as claimed in claim 1 wherein the remote user is allowed a greater level of access the better their security grading.

3. A computer system as claimed in claim 1 wherein the system has at least two predefined levels of access.

4. A computer system as claimed in claim 1 wherein the computer system recognises at least two different security gradings.

5. A computer system as claimed in claim 1 wherein remote users not having a recognised security grading are accorded the lowest level of access and/or are allocated the lowest security grading.

6. A computer system as claimed in claim 1 wherein the means for providing a security grading includes at least one tool for checking at least one aspect of the security of the remote user's computer system.

7. A computer system as claimed in claim 1 wherein the security grading includes an indication of when the security grading was achieved.

8. A computer system as claimed in claim 1 wherein the security grading is time limited.

9. A computer system as claimed in claim 1 wherein the main computer system communicates with a security portal which determines the security grading of the remote user's computer system.

10. A computer system as claimed in claim 9 wherein the security portal has access to records of users and their security gradings.

11. A computer system as claimed in claim 10 wherein the security portal requires a check on the records of users and their security grading in allowing a remote user access.

12. A computer system as claimed in claim 9 wherein the security portal receives data relating to the security grading from the remote user's computer.

13. A method of allowing remote users access to a main computer system comprising the steps of checking a recognised security grading of a remote user's computer system and allowing a level of access based on the security grading which, on failure to recognise a security grading, directs the user to a security grading toolset comprising a number of test modules that a user is invited to complete wherein the security grading achieved by a user is based on the test modules successfully completed, wherein the test modules include at least one module relating to at least one of anti-virus software, firewalls, security patches and updates, and general computer security practice.

14. A security grading system for providing a security grading of a user's computer system wherein the security grading system comprises at least one tool for checking at least one aspect of the security of the user's computer security comprising a plurality of test modules which the user may attempt wherein the security grading of the user's computer system is based on the modules successfully completed, wherein the at least one tool checks for the existence and/or operation of anti-virus software, firewalls and security updates.

15. A security grading system as claimed in claim 14 wherein the security grading system maintains records of user's computer systems and their security gradings and is adapted to supply details regarding the security grading of users to requesting computer systems.

16. A security grading system as claimed in claim 14 wherein the security grading system provides the user's computer system with data relating to its security grading.

17. A method of providing a user with a security grading comprising the steps: of providing the user with a plurality of test modules; and providing a security grading is based on the test modules successfully completed, wherein at least one test module involves performing at least one test of at least one aspect of the security of the user's computer system, wherein the at least one test includes a test on the existence and operation of at least anti-virus software and one or more firewall.

* * * * *